United States Patent

Breitweg et al.

[11] Patent Number: 5,904,221
[45] Date of Patent: May 18, 1999

[54] TOOTHED-RACK POWER-ASSISTED STEERING IN PARTICULAR FOR MOTOR VEHICLES

[75] Inventors: Werner Breitweg; Jürgen Bieber, both of Schwäbisch Gmünd; Arthur Rupp, Hüttlingen, all of Germany

[73] Assignee: ZF Friedrichshafen AG, Friedrichshafen, Germany

[21] Appl. No.: 08/737,170

[22] PCT Filed: Apr. 28, 1995

[86] PCT No.: PCT/EP95/01631

§ 371 Date: Nov. 5, 1996

§ 102(e) Date: Nov. 5, 1996

[87] PCT Pub. No.: WO95/30568

PCT Pub. Date: Nov. 16, 1995

[30] Foreign Application Priority Data

May 5, 1994 [DE] Germany ............................ 44 15 841

[51] Int. Cl.⁶ .............................. B62D 5/22; F16B 21/18; F16L 5/00

[52] U.S. Cl. ............................ 180/417; 24/457; 411/523; 411/524; 285/205; 285/305

[58] Field of Search ....................... 285/305, 205; 24/293, 563, 457, 458; 411/522, 523, 524, 539; 403/155, 154, 319, 316; 180/417

[56] References Cited

U.S. PATENT DOCUMENTS

| | | | |
|---|---|---|---|
| 3,628,768 | 12/1971 | Hutt | 285/305 |
| 4,938,510 | 7/1990 | Gmeiner et al. | 285/305 |
| 5,046,765 | 9/1991 | Usui | 285/305 |
| 5,092,300 | 3/1992 | Imoehl et la. | 285/305 |
| 5,211,427 | 5/1993 | Washizu | 285/305 |
| 5,765,877 | 6/1998 | Sakane et al. | 285/305 |

FOREIGN PATENT DOCUMENTS

| | | | |
|---|---|---|---|
| 3014066 | 10/1981 | Germany . | |
| 3642149 | 7/1987 | Germany | 285/305 |
| 4209000 | 5/1993 | Germany . | |
| 4237481 | 5/1994 | Germany . | |
| 176889 | 7/1989 | Japan | 285/305 |
| 94/06668 | 3/1994 | WIPO . | |

*Primary Examiner*—Daniel G. DePumpo
*Attorney, Agent, or Firm*—Larson & Taylor

[57] ABSTRACT

In a toothed-rack power-assisted steering, which is provided for motor vehicles in particular, a pinion (2) seated in a steering housing (1) is in engagement with a toothed rack (6). A servo motor (8) is disposed as a power assist, whose piston rod (10) is drivingly connected with the toothed rack (6). The two work chambers (12, 13) of the servo motor (8) are connected with a control device (18) via work lines (12, 13), which are connected with a cylinder (11) of the servo motor (8) and with the control device (18) via two connecting elements (24, 25). Each work line (14, 15) has a collar (32). Each line is held on the connecting element (24, 25) by a fastening clasp (34) which projects over the collar (32). The fastening clasp (34) has an essentially rectangular and flat base (35). An elongated slit (36), open toward one side, is located in the base (35), through which the fastening clasp (34) can be pushed from the side over the line (14, 15) and the connecting element (24, 25). In addition, the fastening clasp (34) has two extensions (38) edge-formed out of the base (35) which extend essentially parallel with the long sides of the elongated slit (36). The extensions (38) are embodied to be resilient in the direction perpendicular with the base (35) and well as the direction perpendicular with the long sides of the elongated slit (36).

5 Claims, 2 Drawing Sheets

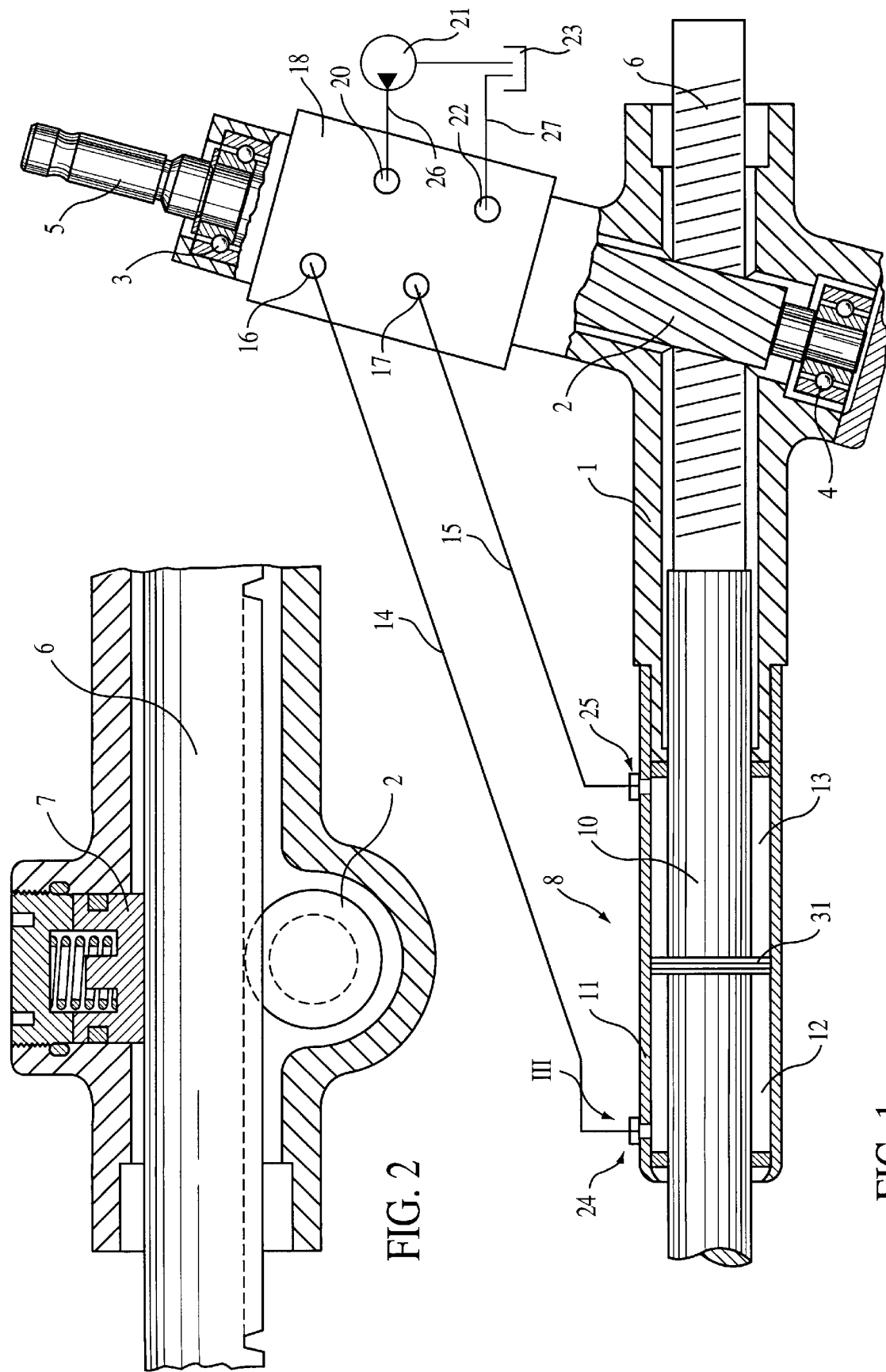

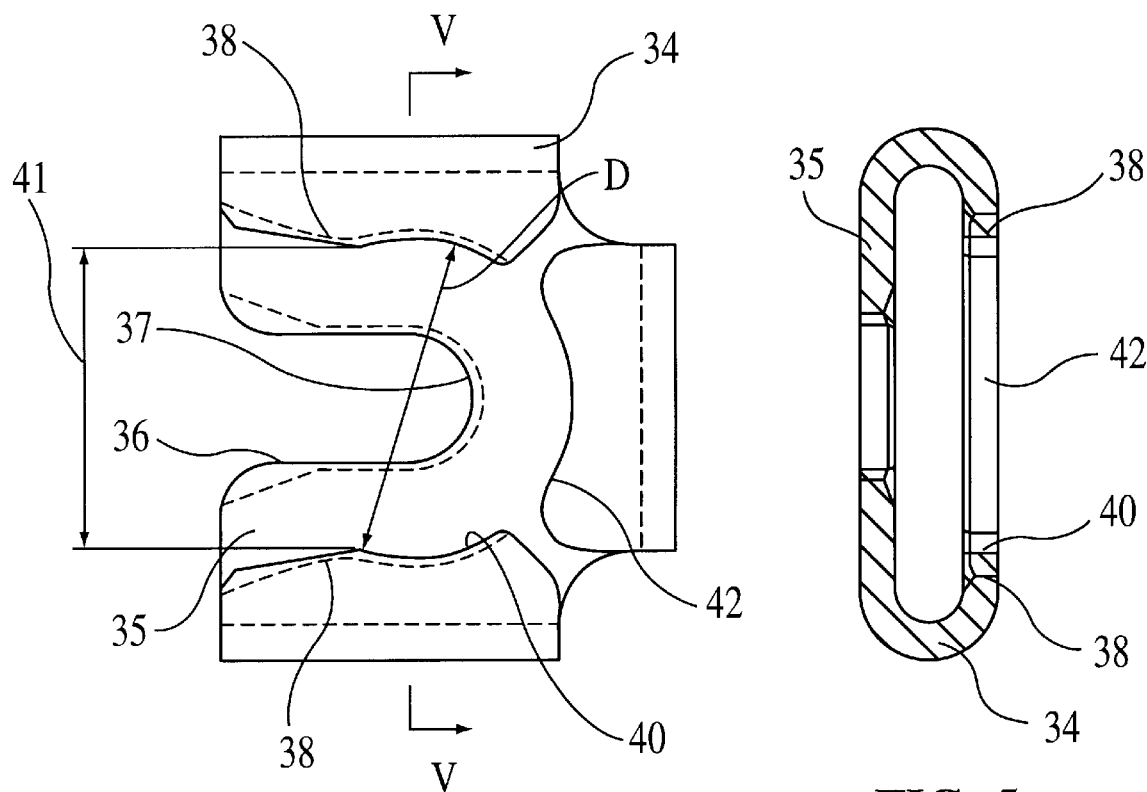
FIG. 4
FIG. 5
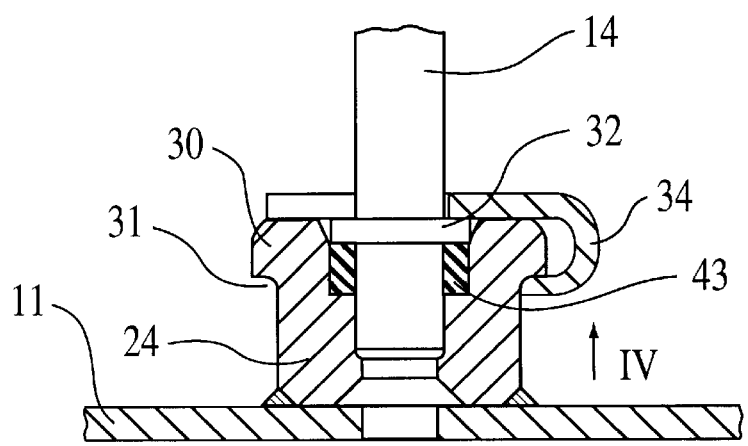
FIG. 3

TOOTHED-RACK POWER-ASSISTED STEERING IN PARTICULAR FOR MOTOR VEHICLES

This is a 371 of PCT/EP95/01631, Apr. 28, 1995.

BACKGROUND OF THE INVENTION

1. Field of the Invention

The invention relates to a toothed-rack, power-assisted steering, in particular for motor vehicles. A pinion is rotatably seated in a steering housing of such power-assisted steering. A toothed rack is guided, axially displaceable, in the steering housing. A servo motor, whose piston rod is drivingly connected with the toothed rack, is used for the power assist. A control device for controlling the pressure medium to and from the servo motor can be adjusted as a function of a movement of the pinion. The two work chambers of the servo motor are connected with the control device via two work lines, which are connected to a cylinder of the servo motor and to the control device by means of connecting elements and which are maintained on the connecting elements by fastening elements, the same as the pressure line from a servo pump and a return line leading to a reservoir.

In accordance with the invention, the lines are fastened on the connecting elements of the servo motor by means of fastening clasps under prestress. The fastening clasps have at least one elastic clamping member which engages an undercut at the free end of the connecting element. In order to prevent easy loosening or too easy disassembly, the fastening clasp has at least one resilient extension which encloses the connecting element and in this way maintains the fastening clasp in a locked manner on the fastening element after assembly.

SUMMARY OF THE INVENTION

It is the object of the invention to further improve the toothed-rack power-assisted steering in accordance with the invention.

This object is attained by means of the toothed-rack power-assisted steering. Useful and advantageous embodiments of the invention are recited in the specification.

In accordance with the invention, the fastening clasp has an essentially rectangular and flat base with an elongated slit, open in the direction of one side of the base, which is provided on its other side with a curvature matched to the line for mounting the fastening clasp from any arbitrary side of the line. In addition, the fastening clasp has two extensions, which are essentially parallel with the long sides of the elongated slit, have been edge-formed out of the base and which have been designed to be resilient in both the direction perpendicularly with the base and in the direction perpendicularly with the long sides of the elongated slit. Together the two extensions form a circular opening, matched to the contour of the undercut of the connecting elements, for mounting and fastening the fastening clasp on the connecting element. This opening is open toward the open side of the elongated slit. Its curvature extends in the direction toward the open side of the elongated slit sufficiently far so that the space between the two ends of the curvature is less than the diameter of the curvature, so that in the course of mounting the fastening clasp the two extensions retreat resiliently from the connecting element and after mounting again take up their original shape and position. Because of this, the extensions partially enclose the connecting element, so that the fastening clasp is securely held on the connecting element, even at high operating pressures of approximately 150 bar.

The fastening clasp usefully has a third extension between the two lateral extensions. The wrapping of the connecting element is improved by this.

The invention will be explained in more detail in what follows by means of an exemplary embodiment represented in the drawings.

BRIEF DESCRIPTION OF THE PREFERRED EMBODIMENTS

FIG. 1, a longitudinal section through the toothed-rack, power-assisted steering in accordance with the invention;

FIG. 2, a partial cross section through the toothed-rack, power-assisted steering in FIG. 1 in the area of the pinion and the pressure element;

FIG. 3, an enlarged section of the cylinder tube in accordance with the arrow III in FIG. 1;

FIG. 4, a top view of the fastening clasp only in accordance with the arrow IV in FIG. 3; and FIG. 5, a section through the fastening clasp along the ne V—V in FIG. 4.

DETAILED DESCRIPTION OF THE PREFERRED EMBODIMENTS

A pinion 2 is rotatably seated in two bearings 3 and 4 of a steering housing 1. On its one end, the pinion 2 has a steering spindle connection 5 for connection to a steering member, for example a steering spindle, not shown, with a steering wheel.

Via its teeth, the pinion 2 is in engagement with a toothed rack 6, which is guided axially displaceable in the steering housing 1. The toothed rack 6 is pressed in a known manner against the teeth of the pinion 2 by means of a spring-loaded pressure element 7.

A servo motor 8 is used for the power assist, whose piston rod 10 is fixedly connected with the toothed-rack 6. In a cylinder 11, the servo motor 8 has two cylinder chambers 12 and 13, which are connected via work lines 14 and 15 with two cylinder connectors 16 and 17 of a control device 18. In addition, the control device 18 also has a feed connector 20, to which a servo pump 21 is connected. A reservoir 23 is connected with a return connector 22. The work lines 14 and 15 are connected by means of two connecting elements 24 and 25 to the cylinder 11.

The control device 18 also has connecting elements, to which the two work lines 14 and 15 are connected, as well as a pressure line 26 from the servo pump 21 and a return line 27 leading to the reservoir 23. The connecting points on the control device 18 and on the cylinder 11 are essentially equivalent. Therefore only one connecting point on the connecting element 24 will be described in what follows.

In the exemplary embodiment in accordance with FIG. 3 the connecting element 24 has been placed as a separate component on the cylinder 11 and is fastened to it in a known manner. An annular collar 30 with an undercut 31 is formed on the free end of the connecting element 24.

On their ends, each work line 14 and 15—the same also applies to the pressure line 26 and the return line 27—has a ring-shaped section, which is limited in its axial length and has a reduced or increased diameter, in the form of a collar 32 or an annular groove. A fastening means in the form of a fastening clasp 34 extends over the collar 32 and engages the undercut 31 of the connecting element 24. An embodiment of the fastening clasp 34 can be seen in FIG. 4. The fastening clasp 34 has an essentially rectangular and flat base with an elongated slit 36, open in the direction of one side of the base, which is provided on its other side with a curvature 37 matched to the line 14. The elongated slit 36 is used for mounting the fastening clasp 34 from any arbitrary side of the line 14. In addition, the fastening clasp 34 has two extensions 38, which are essentially parallel with the long sides of the elongated slit 36 and have been edge-formed out of the base 35. The extensions 38 have been designed to be resilient in both the direction perpendicularly with the base 35 and in the direction perpendicularly with the long sides of the elongated slit 36. Together the two extensions 38 form a circular opening 40, matched to the contour of the undercut 31 of the connecting elements 24, for mounting and fastening the fastening clasp 34 on the connecting element 24.

The opening 40 is open toward the open side of the elongated slit 36. Its curvature extends in the direction toward the open side of the elongated slit 36 sufficiently far so that the space 41 between the two ends of the curvature is less than the diameter D of the curvature of the opening 40.

The two extensions 38 have two purposes: for one, they are used as resilient clamping elements which engage the undercut 31 on the free end of the connecting element 24 and in this way fix the line 14 in the axial direction on the connecting element 24. By means of their pre-stressing in the radial direction of the connecting element 24, they also prevent easy loosening or too easy disassembly in the mounted state.

In order to increase the wrapping of the connecting element 24 in the area of the undercut 31 and in this way to improve the securing of the line 14 in the connecting element 24, a further extension 42 in addition to the two extensions 38 and located between the two extension 38 is provided on the fastening clasp 34. The three extensions 38 and 42 then together form the opening 40 with a common curvature.

The line 14 is cylindrically guided in the connecting element 24 and sealed by means of an O-ring 43.

We claim:

1. A tooth-rack, power-assisted steering for motor vehicles which comprises:

a pinion rotatably seated in a steering housing;

a guided toothed-rack axially displaceable in the steering housing and maintained in engagement with the pinion by a spring-loaded pressure element;

a power assist including a servo-motor provided with a piston rod and two work chambers, and wherein the piston rod is drivingly connected with the toothed-rack;

a control device for controlling the flow of a pressure medium to and from the servo-motor, and which can be adjusted as a function of a movement of the pinion;

wherein the two chambers of the servo-motor are connected with the control device via two work lines which are connected to a cylinder of the servo-motor and to the control device by connecting elements having an undercut, the work lines, a pressure line from a servo-pump, and a return line to a reservoir all being maintained on the connecting elements by fastening clasps, wherein each work, pressure and return line is cylindrical and includes a ring-shaped section, which is limited in its axial length and has an increased diameter as compared to the diameter of the remainder of the work, pressure and return lines, said ring-shaded section being in the form of an annular collar spaced from an adjacent end of the line;

wherein each work, pressure and return line is held by a respective fastening clasp which extends over and engages the collar and engages the undercut on the connecting element;

wherein the fastening clasp includes an essentially rectangular, flat base having at least two sides and an elongate slit open in the direction of one side of the base and having two long sides and one inner side, the inner side of the elongate slit being provided with a curvature matched to the curvature of the work, pressure and return lines such that the fastening clasp can be mounted from any direction on said work, pressure and return lines, the base further including two tab-shaped extensions edge-formed out of the base to be essentially parallel to the long sides of the elongate slit, which extensions are resilient in both the direction perpendicular to the base and the direction perpendicular to the long sides of the elongate slit, and wherein the fastening clasp is elastically deformed after mounting, being fastened on the connecting element due to pre-stress of the tab-shaped extensions such that the tab-shaped extensions biasedly engage the undercut of the connection in the direction perpendicular to the long sides of the elongate slit and biasedly engage the collar in the direction perpendicular to the base, whereby the work, pressure and return lines are firmly secured on the connecting element in the axial direction and the fastening clasp is secured against easy loosening or dismounting from the connecting element.

2. A toothed-rack, power-assisted steering in accordance with claim 1, wherein the two tab-shaped extensions together form a circular opening matched to a cylindrical contour of the undercut of the connecting elements for mounting and fastening the fastening clasp on the connecting elements.

3. The toothed-rack, power-assisted steering of claim 2, wherein the circular opening is open by opposed edges of the tab-shaped extensions toward the open side of the elongate slit for mounting and fastening the fastening clasp on the connecting element; and wherein the opposed edges extend in the direction toward the open side of the elongate slit and away from each other sufficiently far that a space between respective proximal ends of the edges adjacent a curvature of the circular opening is less than the diameter of the curvature of the circular opening.

4. The toothed-rack, power-assisted steering of claim 3, wherein the fastening clasp further comprises a third extension on its side opposite the open side of the elongate slit and that all three extensions together form the circular opening for mounting and fastening the fastening clasp on the connecting element so that, after mounting, the fastening clasp is locked on the connecting elements.

5. A tooth-racked, power-assisted steering in accordance with claim 4, wherein the work, pressure and return lines are guided in the cylindrical undercut of the connecting element and sealed by an O-ring.

* * * * *